US012660804B1

(12) United States Patent　　(10) Patent No.:　US 12,660,804 B1

Senf　　(45) Date of Patent:　Jun. 23, 2026

(54) FISH RELEASE ASSEMBLY

(71) Applicant: Edward Walter Senf, Petaluma, CA (US)

(72) Inventor: Edward Walter Senf, Petaluma, CA (US)

( * ) Notice: Subject to any disclaimer, the term of this patent is extended or adjusted under 35 U.S.C. 154(b) by 0 days.

(21) Appl. No.: 19/174,813

(22) Filed: Apr. 9, 2025

(51) Int. Cl.
| | |
|---|---|
| *A01K 97/18* | (2006.01) |
| *A01K 91/03* | (2006.01) |
| *A01K 95/02* | (2006.01) |
| *A01K 97/00* | (2006.01) |

(52) U.S. Cl.
CPC .............. *A01K 97/18* (2013.01); *A01K 91/03* (2013.01); *A01K 95/02* (2013.01); *A01K 97/00* (2013.01)

(58) Field of Classification Search
CPC ........ A01K 97/00; A01K 99/00; A01K 97/18; A01K 95/02; A01K 91/00; A01K 91/03; A01K 91/04; A01K 91/047; A01K 91/053; A01K 91/06
USPC ............ 43/4, 4.5, 42.72, 42.74, 43.1, 43.12, 43/43.15, 44.97, 53.5
See application file for complete search history.

(56) References Cited

U.S. PATENT DOCUMENTS

| | | | | | |
|---|---|---|---|---|---|
| 1,296,370 | A | * | 3/1919 | Darling | A01K 91/06 |
| | | | | | 43/42.46 |
| 2,033,701 | A | * | 3/1936 | Gibbs | F16B 45/036 |
| | | | | | 43/44.84 |

| | | | | | |
|---|---|---|---|---|---|
| 2,359,588 | A | * | 10/1944 | Shea | A01K 95/02 |
| | | | | | 43/44.84 |
| 2,430,115 | A | * | 11/1947 | Hickson | A01K 97/16 |
| | | | | | 43/44.84 |
| 2,488,475 | A | * | 11/1949 | Merritt | H01F 29/146 |
| | | | | | 294/82.35 |
| 2,562,054 | A | * | 7/1951 | Mathieu | A01K 95/00 |
| | | | | | 29/422 |
| 2,716,832 | A | * | 9/1955 | Minnie, III | A01K 95/00 |
| | | | | | 43/43.12 |
| 2,749,650 | A | * | 6/1956 | Rees | A01K 97/24 |
| | | | | | 43/43.12 |
| 2,844,906 | A | * | 7/1958 | Phillips | A01K 95/00 |
| | | | | | 43/43.12 |
| 2,858,637 | A | * | 11/1958 | Stark | A01K 95/00 |
| | | | | | 43/43.12 |
| 2,907,134 | A | * | 10/1959 | Trautvetter | A01K 97/24 |
| | | | | | 24/115 F |
| 2,988,395 | A | * | 6/1961 | Rogers | B64D 17/383 |
| | | | | | 294/82.35 |
| 3,057,108 | A | * | 10/1962 | Jacobsen | A01K 95/00 |
| | | | | | 43/43.12 |
| 3,068,605 | A | * | 12/1962 | Munsinger | A01K 91/02 |
| | | | | | 43/43.12 |

(Continued)

*Primary Examiner* — Darren W Ark
(74) *Attorney, Agent, or Firm* — Michael D. Eisenberg; MDE Patents

(57)　　　　　　　ABSTRACT

In the disclosed embodiments, a fish release assembly comprises a lanyard comprising a first loop, a second loop, and a pliable structure operatively connected to the second loop of the lanyard; and a sinker release. The sinker release is a cylindrical body comprising: a spring-loaded plunger, a slot, a first eyelet, a second eyelet; a first swivel; and a second swivel. A sinker is operatively connected to the cylindrical body via a hook line. The cylindrical body is operatively connected to the first swivel and the second swivel. The spring-loaded plunger actuates a release mechanism of a fish secured on the lanyard.

20 Claims, 3 Drawing Sheets

(56)  References Cited

U.S. PATENT DOCUMENTS

| | | | | |
|---|---|---|---|---|
| 3,421,250 | A * | 1/1969 | Krieg | A01K 91/053 |
| | | | | 43/44.84 |
| 3,619,932 | A * | 11/1971 | Maxwell | A01K 91/06 |
| | | | | 43/43.12 |
| 3,744,178 | A * | 7/1973 | Denny | A01K 91/053 |
| | | | | 43/44.84 |
| 5,771,625 | A * | 6/1998 | Savaglia | A01K 91/053 |
| | | | | 43/44.84 |
| 5,887,381 | A * | 3/1999 | Stephenson | A01K 95/00 |
| | | | | 43/44.87 |
| 6,101,755 | A * | 8/2000 | Kent | A01K 91/14 |
| | | | | 43/4.5 |
| 6,421,949 | B1 * | 7/2002 | Schytte | A01K 91/06 |
| | | | | 43/43.12 |
| 6,745,511 | B1 * | 6/2004 | Falconer | A01K 91/02 |
| | | | | 43/44.87 |
| 6,862,838 | B1 * | 3/2005 | Gibbs | A01K 91/14 |
| | | | | 43/43.15 |
| 7,032,345 | B2 * | 4/2006 | Dembicks | A01K 83/06 |
| | | | | 24/703.1 |
| D534,237 | S * | 12/2006 | Shelton | D22/144 |
| 7,559,172 | B2 * | 7/2009 | Hogan | A01K 85/00 |
| | | | | 43/4.5 |
| 7,676,982 | B1 * | 3/2010 | Lee | A01K 97/00 |
| | | | | 43/53.5 |
| 7,856,751 | B1 * | 12/2010 | Moncrief | A01K 97/00 |
| | | | | 43/53.5 |
| 7,874,096 | B2 * | 1/2011 | Callaway | A01K 97/00 |
| | | | | 43/4.5 |
| 7,934,336 | B2 * | 5/2011 | Cooksey | A01K 97/00 |
| | | | | 43/53.5 |
| 8,806,800 | B2 * | 8/2014 | Hupp | A01K 97/00 |
| | | | | 43/53.5 |
| 9,241,479 | B2 * | 1/2016 | Poston | A01K 83/06 |
| 9,474,260 | B2 * | 10/2016 | Huebner | A01K 95/00 |
| 9,675,058 | B2 * | 6/2017 | Brown | A01K 97/00 |
| 9,872,486 | B2 * | 1/2018 | Parks | A01K 65/00 |
| 10,701,919 | B2 * | 7/2020 | Porter | A01K 95/02 |
| 11,751,552 | B2 * | 9/2023 | Brown | A01K 83/00 |
| | | | | 43/4.5 |
| 2005/0204608 | A1 * | 9/2005 | Lehmann | A01K 91/04 |
| | | | | 24/600.9 |
| 2006/0156612 | A1 * | 7/2006 | Brzozowski | A01K 95/02 |
| | | | | 43/43.15 |
| 2008/0060254 | A1 * | 3/2008 | Bloomfield | A01K 91/047 |
| | | | | 43/44.84 |
| 2009/0149836 | A1 * | 6/2009 | Teachout | A61D 1/14 |
| | | | | 119/200 |
| 2010/0005698 | A1 * | 1/2010 | Raus | A01K 97/00 |
| | | | | 43/4 |
| 2011/0094146 | A1 * | 4/2011 | Hails | A01K 93/02 |
| | | | | 43/43.15 |
| 2012/0066954 | A1 * | 3/2012 | Barker | A01K 97/02 |
| | | | | 43/42.22 |
| 2012/0260556 | A1 * | 10/2012 | Hupp | A01K 97/00 |
| | | | | 43/4 |
| 2013/0047487 | A1 * | 2/2013 | Hupp | A01K 97/14 |
| | | | | 43/4 |
| 2013/0180160 | A1 * | 7/2013 | Petherick | A01K 91/047 |
| | | | | 29/515 |
| 2015/0373962 | A1 * | 12/2015 | Boyer | A01K 85/10 |
| | | | | 43/43.1 |
| 2016/0278356 | A1 * | 9/2016 | Warnke, Sr. | A01K 95/00 |
| 2024/0081311 | A1 * | 3/2024 | Klym | A01K 95/02 |
| 2025/0280814 | A1 * | 9/2025 | Chalfant | A01K 97/18 |

* cited by examiner

FISH RELEASE ASSEMBLY

FIELD OF INVENTION

The systems and methods herein are directed to devices for fishing.

BACKGROUND OF THE INVENTION

Devices for fishing in aquatic environments capture sea animals, such as fish, on a hook. It is desired to sometimes release said captured fish. Devices in the art include expensive grippers that are bulky and are usually used on separate descending devices, that interfere with the fishing ability when used on fishing pole; and use release mechanisms that pierce the membrane of the released fish to be sent down, which makes the fish prone to disease and can permanently restrict the feeding ability of the fish.

What is needed is the systems and methods herein directed to a fish releasing assembly that can safely and effectively release fish that has been captured or hooked onto a metal piece placed back into aquatic environments.

BRIEF SUMMARY OF THE EMBODIMENTS OF THE INVENTION

In a variant, a fish release assembly comprises: a lanyard comprising a first loop, a second loop, and a pliable structure operatively connected to the second loop of the lanyard; a sinker release, wherein the sinker release is a cylindrical body comprising: a spring-loaded plunger, a slot, a first eyelet, a second eyelet; a first swivel; and a second swivel; a sinker operatively connected to the cylindrical body via a hook line; wherein the cylindrical body is operatively connected to the first swivel and the second swivel; wherein the spring-loaded plunger actuates a release mechanism of a fish secured on the lanyard.

In a variant, the slot is proximal to the spring-loaded plunger.

In a variant, the first and second swivels each comprise an extending body and a dual loop structure.

In a variant, the pliable structure makes an operational connection with the slot.

In a variant, the first and second eyelets are a looped metal connection point fused to the cylindrical body.

In a variant, the looped metal connected point fused to the cylindrical body is U-shaped or oval shaped with a stem.

In a variant, the first loop of the lanyard is proximal to a first metal crimp.

In a variant, the bead is fitted onto the first loop of the lanyard.

In a variant, the bead is configured to receive a force to actuate the release mechanism.

In a variant, the release mechanism is depressing the spring-loaded plunger.

In a variant, the spring-loaded plunger is depressed, thereby engaging or disengaging a part of the lanyard from the spring-loaded plunger.

In a variant, a bottom portion of the lanyard maintains connection with the sinker release, when the pliable loop is fitted into the slot.

In a variant, the second loop of the lanyard is proximal to a second metal crimp.

In a variant, the pliable structure comprises two loops corresponding to a figure eight shape.

In a variant, a method for releasing a fish caught on a fishing line, comprises: placing a fish release assembly into an aquatic environment for catching the fish; wherein the fish release assembly comprises: a lanyard comprising a first loop, a second loop, and a pliable structure operatively connected to the second loop of the lanyard; a sinker release, wherein the sinker release is a cylindrical body comprising: a spring-loaded plunger, a slot, a first eyelet, and a second eyelet; a first swivel; a second swivel; a sinker operatively connected to the cylindrical body via a hook line; wherein the cylindrical body is operatively connected to the first swivel and the second swivel; wherein the spring-loaded plunger actuates a release mechanism of a fish secured on the lanyard.

In a variant, the first loop of the lanyard is proximal to a first metal crimp.

In a variant, the spring-loaded plunger is depressed, thereby engaging or disengaging a part of the lanyard from the spring-loaded plunger.

In a variant, the pliable structure of the lanyard is configured to derive at least two loops.

In a variant, the pliable structure makes an operational connection with the slot.

In a variant, the second loop of the lanyard is proximal to a second metal crimp.

BRIEF DESCRIPTION OF THE FIGURES

The systems and methods herein are directed to a fish release assembly that can operate singularly (i.e., obviation of usage of a separate descending device), wherein the fish release assembly comprises a cylindrical body, such as sinker release device and a lanyard. In the cylindrical body, a spring-loaded plunger resides therein to actuate the release mechanism of a fish secured on the lanyard.

Figure 1:
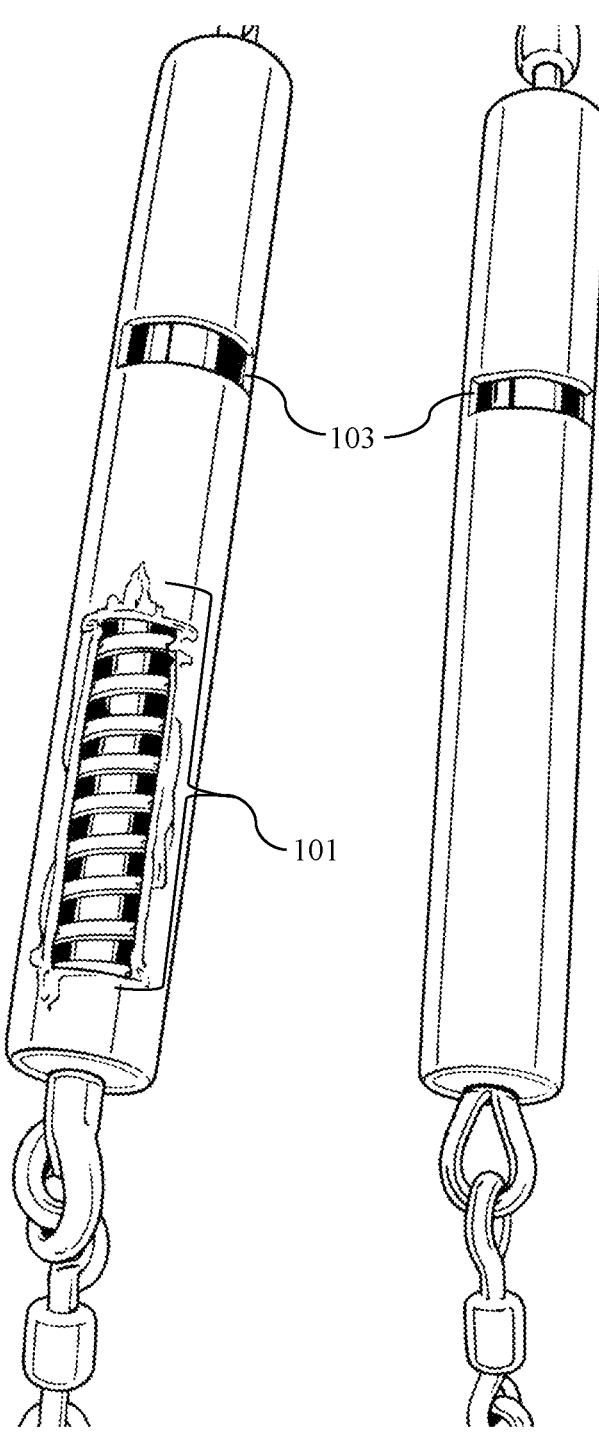
FIG. 1 is a depiction of two units of the cylindrical body containing the spring that resides therein to actuate the release mechanism of a fish secured on a lanyard.

The figures are not intended to be exhaustive or to limit the invention to the precise form disclosed. It should be understood that the invention can be practiced with modification and alteration and that the invention is not limited by the claims and the equivalents thereof.

Some of the figures included herein illustrate various embodiments of the invention from different viewing angles. Although the accompanying descriptive text may refer to such views as "top", "bottom" or "side" views, such references are merely descriptive and do not imply or require that the invention be implemented or used in a particular spatial orientation unless explicitly stated otherwise.

DETAILED DESCRIPTION OF THE EMBODIMENTS OF THE INVENTION

The systems and methods herein are directed to a fish release assembly that can operate singularly (i.e., obviation of usage of a separate descending device). The fish release assembly comprises a sinker release, lanyard operatively connected to the sinker release, a hook line operatively connected to the sinker release, and the sinker operatively connected to the hook line. The sinker release is a cylindrical body containing a spring-loaded plunger therein and bead that actuate the release mechanism of a fish secured on the lanyard.

In the systems and methods herein, the products secured on the lanyard of the fish release assembly can be fish or a similar type of organism. The spring-loaded plunger in the cylindrical body of the fish release assembly is operatively connected, or in operational contact, with a bead that is in operational contact with a first connector and lanyard that terminates with a pliable structure for deriving loops (e.g., a figure eight snap). The pliable structure of the lanyard can make operational contact with, and thus fit into, a slot of the cylindrical body, wherein the slot is proximal to a second connector. These operational contacts can actuate a release mechanism of a fish secured on the lanyard of the fish release assembly, when said assembly is descended into an aquatic environment, without piercing the membrane of the released fish to be sent down; and without using another piece of equipment for descension.

In the systems and methods herein, the fish release assembly is a small and inconspicuous device that can be: (1) applied to all fishing systems (for capturing fish) and (2) utilized while fishing, thereby allowing the fisherman to immediately send the fish back to the depth the fish was caught, via actuation of the release mechanism and forces applied on the spring, of fish secured on the lanyard, without piercing the membrane of the fish. This increases the quality of life of the fish and allows the fisherman more fishing time.

The fish release assembly, of the systems and methods herein, is described herein in terms of example embodiments. After reading this description, it will become apparent to one of ordinary skill in the art how the invention can be implemented in different and alternative embodiments.

From time-to-time, the fish release assembly, of the systems and methods herein, is described herein in terms of example environments. Description in terms of these environments is provided to allow the various features and embodiments of the fish release assembly, of the systems and methods herein, to be portrayed in the context of an exemplary application. After reading this description, it will become apparent to one of ordinary skill in the art how the fish release assembly of the systems and methods herein, can be implemented in different and alternative environments.

Figure 2:
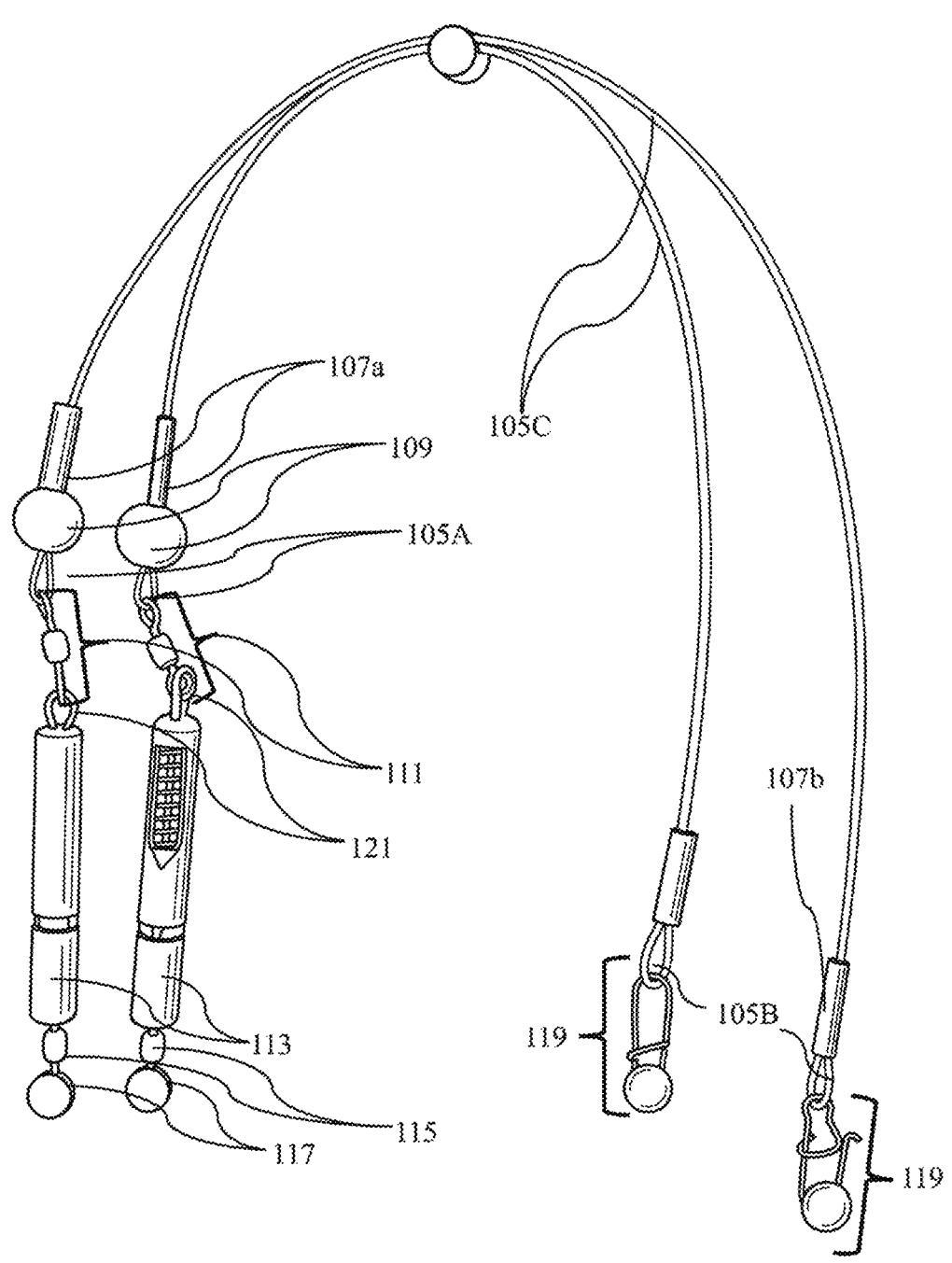
FIG. 2 is a depiction of two units of the fish release assembly comprising the cylindrical body and the lanyard.
Figure 3:
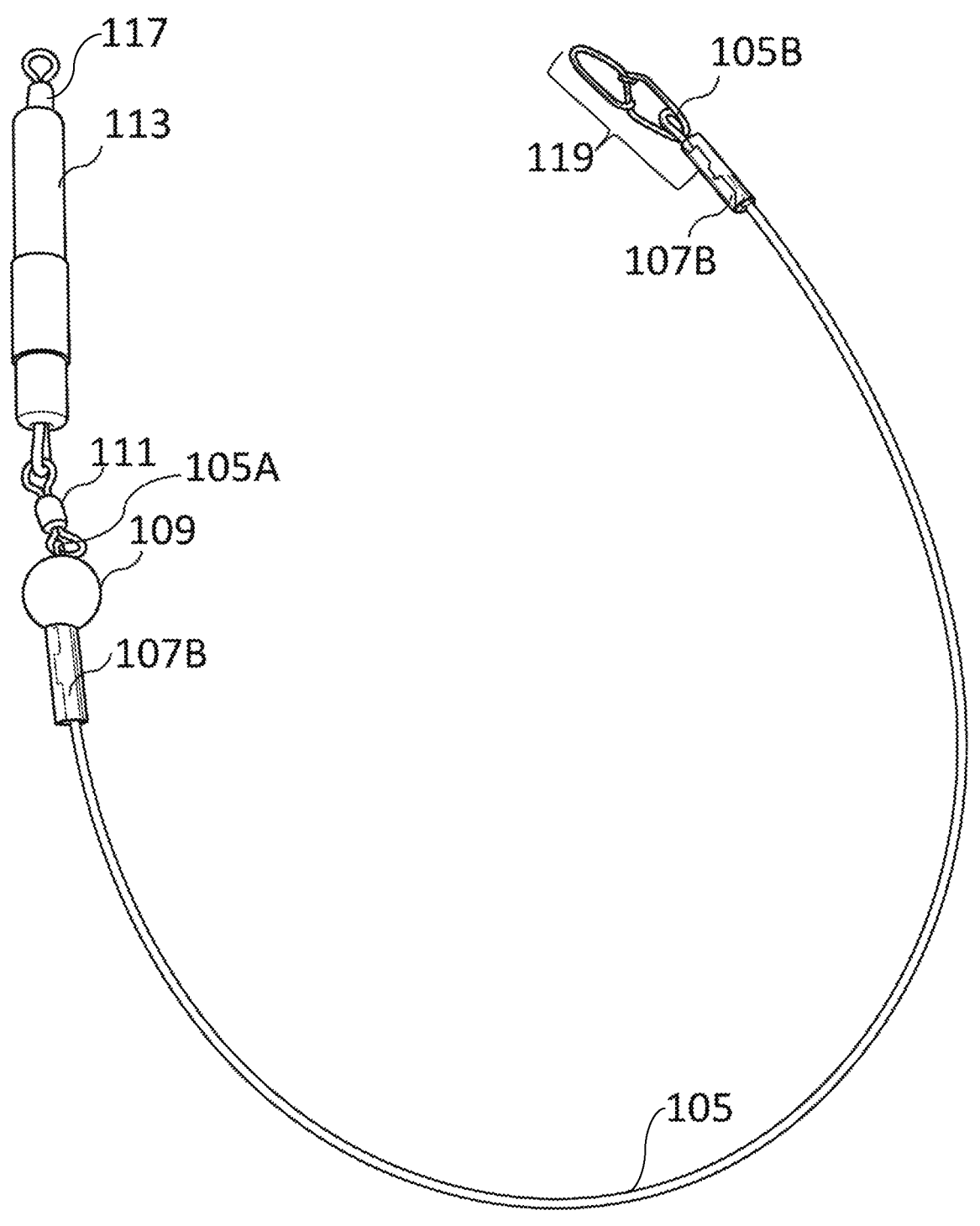
FIG. 3 is another depiction of the fish release assembly comprising the cylindrical body and the lanyard.

In the systems and methods herein, the fish release assembly, as depicted in FIG. 1 and FIG. 2, comprises: sinker release 113; lanyard 105; a hook line, with hooks; and a sinker operatively connected to the hook line.

In the system and methods herein, a spring (spring 101) can be placed within sinker release 113 (a hollow cylindrical base equipped with a plunger that is spring loaded) to work with a plunger of sinker release 113. Spring 101 and the plunger of sinker release 113 make a spring-loaded plunger system that works, in operational contact, with the other components of sinker release 113, such as: (1) slot 103 (i.e., a plunger access port) on the surface on sinker release 113; (2) a first swivel (connector 111) for attachment to a lanyard at a first end of sinker release 113 and the first end of the lanyard; (3) a second swivel (connector 117) at a second end of sinker release 113; and (4) a bead that is spherical body (bead 109) at the first end of sinker release 113, that can be pressed against to assist in pulling the plunger down to connect the lanyard to the plunger (see FIG. 1). The first end of sinker release 113, which has eyelet 121, makes an operational connection to connector 111, wherein connector 111 is in turn connected to looped-end 105A of lanyard 105; and the second end of sinker release 113 has eyelet 115, makes an operational connection to connector 117, which in turn can make an operational connection to a main fishing line. Snap 119 is operatively connected to looped-end 105B of lanyard 105. Looped-end 105A and looped-end 105B of lanyard 105 are separated by the body of lanyard 105.

In the systems and methods herein, connector 111 and connector 117 are swivels. Eyelet 121 can appear as the fused loop that is a U-shape (left depiction of eyelet 121) or an oval attached to a stem (right depiction of eyelet 121), as a point of contact to sinker release 113. Eyelet 121 of the cylindrical body of sinker release 113 is operatively connected to lanyard 105 via connector piece 111.

In the systems and methods herein, the swivels (connectors 111 and 117) can have a dual-looped structure with an extending body with a cylindrical piece surrounding the extending body, wherein the dual-looped structure includes: (1) a loop attached to the extending body in an operational contact with eyelet 121; and (2) a loop attached to the extending body in operational contact with loop 105A of the lanyard 105, wherein the two loops of the swivel attached to the extending body of the swivel are opposite to each other, along the extending body of the swivel.

In the systems and methods herein, by pulling on bead 109 and holding sinker release 113, the plunger is depressed so the top part of the lanyard can engage or disengage from the plunger. This actuates the release mechanism of the fish release assembly to: (1) allow a fish to be secured on lanyard 105 and (2) secure lanyard 105 into slot 103 via pliable structure 119, when: (1) pliable structure 119 is a figure eight snap that is fitted into slot 103, such that (2) the bottom of lanyard 105 is never disconnected. With a sharp tug on the fishing pole that is connected to sinker release 113, the plunger in sinker release 113 is releasing lanyard 105; and lanyard 105 is pulling through the gill plate of the fish. The fish can swim away and be returned to an initially descended position, without having a pierced membrane.

In the systems and methods herein, spring 101 can be in a compressed state or expanded state, corresponding to force applied on a plunger that moves within the cylindrical body of sinker release 113 to facilitate actuation of the release mechanism.

In the system and methods herein, lanyard 105 has two loops, looped-ends 105A and 105B, at the two terminating ends of lanyard. To maintain the loops in lanyard 105, metal crimping 107A and metal crimping 107B are fitted onto lanyard 105. Proximal to metal crimping 107A, looped-end 105A extends out from bead 109. Proximal to metal crimping 107B, looped-end 105B extends out from lanyard 105.

The combination of: (1) the cylindrical body shape of sinker release 113, which has spring 101 and the plunger therein; (2) connector piece 111; and (3) bead 109, serves as: an anchor and control point, for descending lanyard 105, further into an aquatic environment. When force is applied against spring 101, tension can be transferred from sinker release 113 to dual-loop 119 and connector piece 117, when dual-loop 119 is fitted into slot 103. Hooks and sinker are operatively connected to connector piece 111.

In the systems and methods herein, pliable structure 119 of lanyard 105 is composed of a pliable metal or other pliable material, which can secure fish. The pliable metal of pliable structure 119 is used to derive and make pliable structure 119 into two or more loops, wherein there is a loop that can be open ended (see right depiction of pliable structure 119) and all of the loops can be closed ended (see left depiction of pliable structure 119). Pliable structure 119 can receive tension from the force applied on spring 101 for actuating a release mechanism of fish secured on the lanyard descending into an aquatic environment (e.g., oceans, seas, lakes, rivers, and estuaries), without piercing the fish that was captured. The weight of the fish and the sinker and a little tug from the operator then activates the plunger to release the fish.

Examples

To facilitate understanding of the embodiments of the systems and methods herein, examples that have been reduced to actual practice are described below. These examples in no way confine or limit the scope of the claims.

A manufactured sinker releasing device (sinker release 113) was converted into a fish releasing assembly, by adding a stiff piece of monofilament (lanyard 105) to the moving end of the device and attaching a small connector (connector 111) to the other end of this monofilament. Connector 111 prevented the monofilament from chaffing and allowed the larger diameter portion of the monofilament to be connected to the smaller sinker release port (slot 103). This then allowed the operator to disconnect the snap (pliable structure 119), from sinker release 113; and pass the snap (pliable structure 119) and monofilament end through the bottom of the gill plate of the fish and out the mouth of the fish. The snap (pliable structure 119) and monofilament were then, after pulling on the plunger of the sinker release 113, inserted into the sinker release port (slot 103) and secured, by releasing the spring loaded plunger. The fish was then returned to the depth that the fish was caught. With a small jerk of the line (by the weight of the sinker and the weight of the fish and the operator), the release of the spring loaded plunger was actuated for the release of the snap. The monofilament (e.g., tension transferred to lanyard 105) was also pulled out of the fish, thereby releasing the fish from the lanyard. The fish release assembly proved to be a small non-intrusive device that allowed the fisherman to continue fishing with the same fishing pole, wherein the fish was not harmed or altered by the fish release assembly.

Unless defined otherwise, all technical and scientific terms used herein have the same meaning as is commonly understood by one of ordinary skill in the art to which this invention (i.e., the fish release assembly of the systems and methods herein) belongs. All patents, applications, published applications and other publications referred to herein are incorporated by reference in their entirety. If a definition set forth in this section is contrary to or otherwise inconsistent with a definition set forth in applications, published applications and other publications, that are herein incorporated by reference, the definition set forth in this document prevails over the definition that is incorporated herein by reference.

While various embodiments of the present invention have been described above, it should be understood that they have been presented by way of example only and not by limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical, or physical partitioning and configurations can be implemented to accomplish the desired features of the present invention. Also, a multitude of different constituent module names other than those depicted herein can be applied to the various partitions. Additionally, with regard to operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document and variations thereof, unless otherwise expressly stated, should be construed as open ended as opposed to limiting. As examples of the foregoing: the term "including" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. In addition, when a single callout line in the drawings leads to two or more separate reference numbers (first, second, etc. reference numbers), (and each reference numeral refers to a different piece of text in the detailed description) and it would be inconsistent to designate the drawing item being called out as both pieces of text, the drawing should be interpreted as illustrating two different variants. In one variant, the drawing item is referred to by the first reference number and in another variant, the drawing item is referred to by the second reference number, etc.

The presence of broadening words and phrases such as "one or more," "at least," "but not limited to," or other like phrases in some instances shall not be read to mean that the narrower case is intended or required in instances where such broadening phrases may be absent.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A fish release assembly comprising:
   a lanyard comprising a first loop, a second loop, and a pliable structure operatively connected to the second loop of the lanyard;
   a sinker release, wherein the sinker release is a cylindrical body comprising: a spring-loaded plunger, a slot, a first eyelet, and a second eyelet;
   a first swivel; and
   a second swivel;
   wherein the cylindrical body is operatively connected to the first swivel and the second swivel;
   wherein the cylindrical body is a hollow body and the spring-loaded plunger resides in the hollow body.

2. The fish release assembly of claim 1, wherein the slot is proximal to the spring-loaded plunger.

3. The fish release assembly of claim 1, wherein the first and second swivels each comprise an extending body and a dual loop structure.

4. The fish release assembly of claim 1, wherein the pliable structure makes an operational connection with the slot.

5. The fish release assembly of claim 1, wherein the first and second eyelets each comprise a looped metal connection point fused to the cylindrical body.

6. The fish release assembly of claim 5, wherein the looped metal connection point fused to the cylindrical body is U-shaped or oval shaped with a stem.

7. The fish release assembly of claim 1, wherein the first loop of the lanyard is proximal to a first metal crimp.

8. The fish release assembly of claim 1, further comprises a bead which is fitted onto the first loop of the lanyard.

9. The fish release assembly of claim 8, wherein the bead is configured to receive a force to actuate a release mechanism.

10. The fish release assembly of claim 9, wherein the release mechanism is depressing the spring-loaded plunger.

11. The fish release assembly of claim 10, wherein the spring-loaded plunger is depressed, thereby engaging or disengaging a part of the lanyard from the spring-loaded plunger.

12. The fish release assembly of claim 10, wherein a bottom portion of the lanyard maintains connection with the sinker release, when the pliable structure is fitted into the slot.

13. The fish release assembly of claim 1, wherein the second loop of the lanyard is proximal to a second metal crimp.

14. The fish release assembly of claim 1, wherein the pliable structure is configured to resemble a figure eight snap.

15. A method for releasing a fish caught on a fishing line, comprising:
   placing a fish release assembly into an aquatic environment for catch the fish; wherein the fish release assembly comprises:
   a lanyard comprising a first loop, a second loop, and a pliable structure operatively connected to the second loop of the lanyard;
   a sinker release, wherein the sinker release is a cylindrical body comprising: a spring-loaded plunger, a slot, a first eyelet, and a second eyelet;
   a first swivel; and
   a second swivel;
   wherein the cylindrical body is operatively connected to the first swivel and the second swivel;
   wherein the cylindrical body is hollow and the spring-loaded plunger resides in the hollow body.

16. The method of claim 15, wherein the first loop of the lanyard is proximal to a first metal crimp.

17. The method of claim 15, wherein the spring-loaded plunger is depressed, thereby engaging or disengaging a part of the lanyard from the spring-loaded plunger.

18. The method of claim 15, wherein the pliable structure of the lanyard is configured to derive at least two loops.

19. The method of claim 15, wherein the pliable structure makes an operational connection with the slot.

20. The method of claim 15, wherein the second loop of the lanyard is proximal to a second metal crimp.

* * * * *